April 28, 1970 — B. WEISSMAN — 3,508,334
DENTAL PARALLELING GUIDE
Filed March 20, 1968
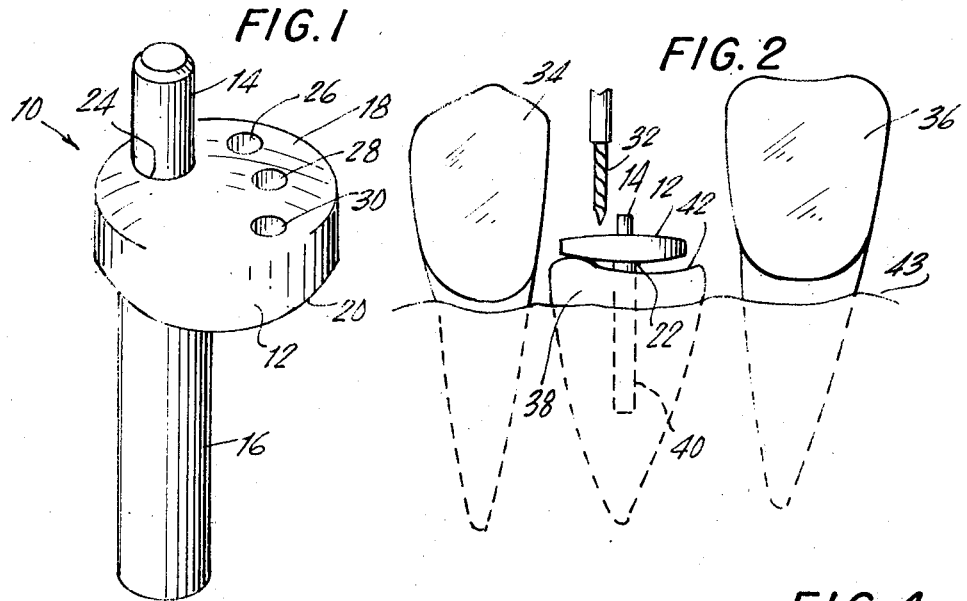
FIG.1  FIG.2
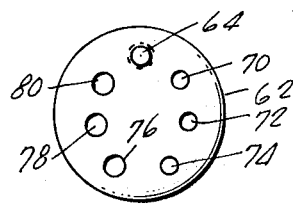
FIG.6A
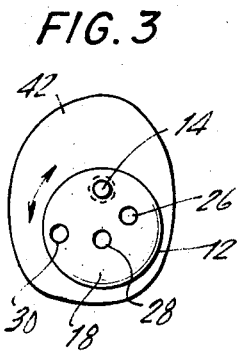
FIG.3
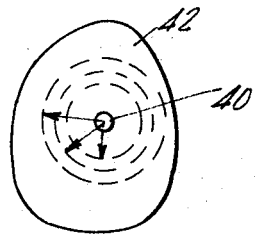
FIG.4
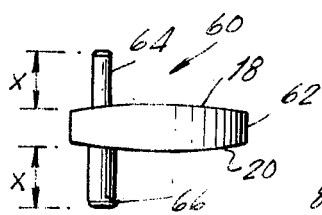
FIG.6
FIG.5
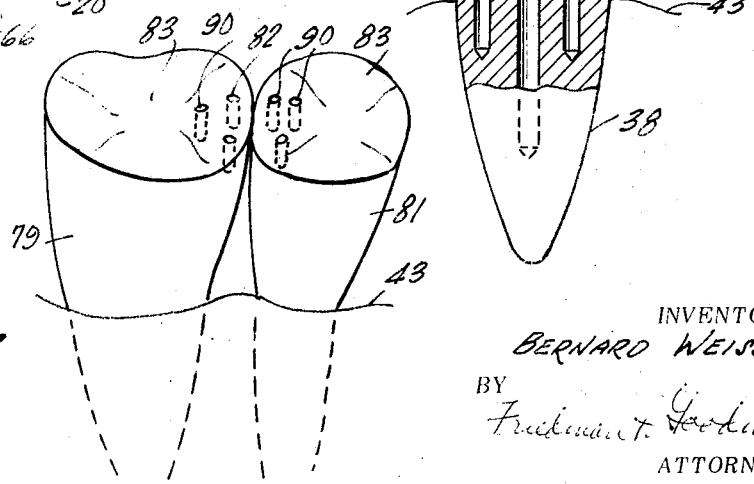
FIG.7
INVENTOR.
BERNARD WEISSMAN
BY
ATTORNEYS United States Patent Office 3,508,334
Patented Apr. 28, 1970

3,508,334
DENTAL PARALLELING GUIDE
Bernard Weissman, 304 Ashland Place,
Brooklyn, N.Y. 11217
Filed Mar. 20, 1968, Ser. No. 714,627
Int. Cl. A61c 3/00
U.S. Cl. 32—67                                    7 Claims

ABSTRACT OF THE DISCLOSURE

The invention is directed to a novel dental paralleling guide adapted to be pivotally and vertically held in a desired part of a tooth, and being simultaneously adapted to provide for the drilling of parallel holes in said tooth, or a model of said tooth.

BACKGROUND OF THE INVENTION

Field of the invention

The invention relates generally to dental fixtures and particularly to paralleling devices for preparing parallel holes in teeth or models of the teeth.

Description of the prior art

In the art of prosthetic restoration, as well as in many other dental operations, it is often necessary to drill parallel holes in the teeth. For example, in order to provide an artificial crown for a tooth, what is done is to first grind the crown portion of the tooth down to the root surface and thereafter a peg or support, usually gold, for the artificial crown, is inserted into the root by means of parallel holes drilled into the root. The drilling of these parallel holes may be performed without mechanical aids, but the dentist must possess considerable skill and dexterity to achieve the required degree of precision. As a result, vairous mechanical devices have been developed to aid him in accomplishing this task. However, none of the fixtures or guides thus far available has proved entirely satisfactory. For example, one prior art device comprises a paralleling apparatus which must be held firmly between the upper and lower teeth of the patient and various pivots and swivels are connected on the device which ultimately lead to a holder for holding the dental drill. Not only is this apparatus extremely complicated in construction, but its accurate use is contingent upon its being held firmly between the upper and lower teeth of the patient, which is obviously undesirable since various factors such as age, nervousness, or infirmity may interfere with the holding of the device by the patient's teeth.

SUMMARY OF THE INVENTION

It is, therefore, among one of the principal objectives of this invention to provide a dental paralleling guide which is both simple in construction and highly precise in its use.

In accordance with the present invention there has now been provided a novel dental paralleling guide which is adapted to be pivotally and vertically held in the desired part of the tooth and is simultaneously adapted to provide for the drilling of parallel holes in said tooth, or a model of the same. The dental paralleling guide, hereinafter referred to as "guide," comprises a drill positioning member disposed between upper and lower vertical post members, the upper post member being preferably shorter and thinner than the lower, the drill positioning member containing a plurality of parallel holes for turningly receiving a dental drill therethrough.

BRIEF DESCRIPTION OF THE DRAWING

The invention will be hereinafter more fully described with reference to the accompanying drawing, in which:

FIGURE 1 is an enlarged perspective view of the invention guide device;

FIGURE 2 is an elevated view showing the invention guide inserted into the exposed root of a tooth with the relative position of a drill thereto;

FIGURE 3 is a top plan view of the guide as shown inserted in FIG. 2;

FIGURE 4 is a diagrammatic view showing the relative radial positions of the drilling locations on the root surface;

FIGURE 5 is an elevated view, partially in cross-section, showing the resultant drilled parallel holes in the tooth obtained by the use of the invention device;

FIGURE 6 is a side elevational view of another embodiment of the invention;

FIGURE 6a is a top plan view of the embodiment of FIG. 6; and

FIGURE 7 is a view in perspective showing parallel holes drilled into two different teeth using the guide of FIGS. 6 and 6a.

DESCRIPTION OF THE PREFERRED
EMBODIMENTS

Referring now to the figures of the drawing, there is shown illustrated in FIG. 1, the invention guide 10. Guide 10 comprises a drill positioning member 12 disposed, in off-centered relationship, between an upper cylindrical post 14 and lower cylindrical post 16; upper post 14 extending vertically upwardly from positioning member 12 and lower post 16 extending vertically downwardly therefrom. Positioning member 12 is generally round tablet-shaped with convex upper and lower faces 18 and 20, respectively. Positioning member 12, as described, is located intermediate of upper post 14 and lower post 16, and is at right angles thereto. Upper post 14 is of a thinner and shorter dimension than lower post 16 and both posts, preferably, may be formed of an integral unit with positioning member 12; or separately with positioning member 12 resting and being suitably secured on the resulting shoulder 22, formed by the two differing diameters of the upper and lower posts, via bore 24 off-centerly located between faces 18 and 20 thereof. A series of three parallel bores 26, 28 and 30 are provided through positioning member 12 between faces 18 and 20 thereof, said bores being radially directed from upper post 14 in increasing radial distance therefrom (FIG. 3). Bores 26, 28 and 30 are in turn parallel to posts 14 and 16, and are of a size to turningly receive the desired drill bit 32, whose operation will be presently described.

Describing now the operation of the guide 10, FIG. 2 illustrates a pair of teeth 34, 36 which may be anterior or posterior, this not being critical to the invention. Between teeth 34 and 36 is shown a tooth 38 which has been ground down close to the root, so that a crown may be constructed thereon. Gum line 43 is also shown. A vertical hole 40 is drilled vertically into the approximate center of tooth 38 using a drill bit of a size sufficient to enable bore 40 to pivotally engage lower post 16 (of guide 10) when inserted therein. Note that bore 40 is of a depth which allows positioning member 12 to rotate freely above the surface 42 of tooth 38 by virtue of a space therebetween. The advantage of the convex construction of lower face 20 is now readily apparent, i.e., positioning member 12 is freely and associatingly accommodated above the concave surface 42 of tooth 38 resting on any elevated portion thereof. After lower post 16 has been pivotally inserted into bore 40, the next drilling operation begins. Drill bit 32, of whatever size desired, but of narrower diameter than the drill bit making bore 40, since post 16 is relatively gross when compared to bores 26, 28 and 30, is then positioned over one of the bores, e.g. 26, and the drill bit 32 is actuated and is allowed to drill a hole 44 through bore 26. The positioning member is then pivotally rotated around the lower post 16 over tooth surface 42 to the desired location and another hole 46 is drilled into the tooth 38 through bore 28, and another hole, etc., through bore 30. All the drilled holes are resultingly and precisely parallel (FIG. 5) having been drilled in relation to a fixed vertical, pivotal axis, i.e., that represented by lower post 16. It is to be noted that the lower post 16 being pivotally engaged in bore 40, the positioning member 12 may be rotated over 360° in either direction (FIGS. 3 and 4) until the desired spot to be drilled on the surface of the root is located, the drilling taking place wherever desired via the increasing radial distanced bores from post 14. Guide 10 is particularly adaptable to a "floating" drill, well known to the art. Bores 26, 28 and 30 are of a size to turningly accommodate the desired size drill bit. Upper post 14 is shorter and narrower than lower post 16, in order to allow the greatest possible clearance for the drilling operation.

Referring now to another embodiment of the invention, there is shown a guide 60 which comprises a drill-positioning member 62 disposed, in off-centered relationship, between an upper cylindrical post 64 and a lower cylindrical post 66, as earlier described with regard to guide 10, and similar thereto. In this embodiment, however, the height "X" of both posts is the same, and the lower post 66 is of considerably narrower dimension than its counterpart (post 16) for a reason to be subsequently disclosed. Positioning member 60 is of the same construction as member 12 except that member 60 contains two sets of axially parallel bores 70, 72, 74 and 76, 78 and 80, the bores in each set being radially directed from upper post 64 in increasing radial distance therefrom (FIG. 6a), as described for the earlier embodiment.

Guide 60 is particularly suitable for drilling parallel holes between two adjacent teeth 79, 81 (FIG. 7) for attaching certain types of bridging connections, conventionally known, to the occlusal surfaces 83 thereof.

The dimensions of a typical guide 60 which will serve as an example of the invention are as follows; it being understood that the example is merely illustrative and not intended to be limitative:

|  | Inch diam. |
|---|---|
| Bores 70, 72, 74 | 0.0245 |
| Bores 76, 78, 80 | 0.0285 |
| Upper post 64 | 0.023 |
| Lower post 66 | 0.027 |

The operation of guide 60 is as earlier described in connection with guide 10, except that now lower post 66 is of such a diameter that its pivotally receiving bore 82 is in the same size range as the holes 90 formed through bores 76, 78 and 80, by suitably sized drill bits turningly accommodated therein. For example, a 0.28 inch diam. drill bit would be used through bores 76, 78, 80 and a 0.024 inch diam. drill bit would be used through bores 70, 72 74 (using the specific illustrative example above). Thus, another feature of the invention becomes apparent, and that is post 66 may be inserted into the holes formed by the 0.028 inch diam. drill bit, and the next desired hole drilled at a desired location, and conversely, the guide 60 may be inverted and post 64 inserted into a hole formed by the 0.024 inch diam. drill bit, and so forth in "leap-frogging" fashion between the two adjacent teeth 79, 81.

It is another feature of the invention that, in contrast to the prior art dental paralleling guides, a miniature paralleling guide is provided which is particularly suitably adapted to working in the mouth being generally of size comparable to the size of a tooth. Thus, it can quite readily be manipulated between teeth in the mouth when working in such restricted spaces.

The guide inventive device is formed of a suitable metal, such as steel, surgical steel, or the like, which is well known to the dental art.

Having thus described the invention as applied to a specific embodiment thereof, it is understood that various changes may be made by those skilled in the art without departing from the spirit and scope thereof.

What is claimed is:

1. A dental paralleling guide comprising a drill positioning member and a post member, said drill positioning member extending laterally from said post member and being adapted to overlie a portion of a tooth, said drill positioning member being provided with a plurality of bores axially parallel with said post member for turningly receiving a drill therethrough, said bores being radially spaced from said post member, wherein said post member further comprises an upper and lower post member, said positioning member being disposed therebetween, said upper post member being of generally smaller dimensions than said lower post member, there being three bores provided in said positioning member, each of said bores being at differing radial distances from said post members.

2. A guide according to claim 1, wherein said upper and lower post members are of generally the same height, there being six bores provided in said positioning member.

3. A guide according to claim 1, wherein said post member is of a size to be received in a hole drilled into said tooth through said bore.

4. A dental paralleling guide comprising a drill positioning member and a post member, said drill positioning member extending laterally from said post member and being adapted to overlie a portion of a tooth, said drill positioning member being provided with a plurality of bores axially parallel with said post member for turningly receiving a drill therethrough, said bore being radially spaced from said post member, wherein said post member further comprises an upper and lower post member, said positioning member being disposed therebetween, said upper post member being of generally smaller dimensions than said lower post member, there being three bores provided in said positioning member, each of said bores being at differing radial distances from said post members, and wherein said positioning member further comprises a generally round-shaped tablet form having generally convex upper and lower faces, said positioning member being in off-centerly relation to said upper and lower posts, said upper post being received through an off-center bore provided between said upper and lower faces.

5. A dental paralleling guide comprising a drill positioning member and a post member, said drill positioning member extending laterally from said post member and being adapted to overlie a portion of a tooth, said drill positioning member being provided with a plurality of bores axially parallel with said post member for turningly receiving a drill therethrough, said bore being radially spaced from said post member, and wherein said post member further comprises an upper and lower post member, said positioning member being disposed therebetween, said upper post member being of generally smaller dimensions than said lower post member, there being three bores provided in said positioning member, each of said bores being at differing radial distances from said post members, and wherein said upper and lower post members are of generally the same height, there being six bores provided in said positioning member, and wherein said positioning member further comprises a generally round-shaped tablet form having generally convex upper and lower faces, said positioning member being in off-centerly relation to said upper and lower posts.

6. A guide according to claim 5, wherein three of said bores are of substantially equivalent diameter and the other three of said bores are of substantially equivalent but larger diameter.

7. A guide according to claim 6, wherein said post members are each of a size to be received in a hole drilled into said tooth through said bore.

References Cited

UNITED STATES PATENTS 1,380,040    5/1921    Chayes _____ 32—67

FOREIGN PATENTS 120,013    10/1918    Great Britain.

ROBERT PESHOCK, Primary Examiner